United States Patent
Matsumoto

(10) Patent No.: US 7,190,540 B2
(45) Date of Patent: Mar. 13, 2007

(54) PORTABLE APPARATUS HAVING HEAD RETRACTING FUNCTION AND HEAD RETRACTING METHOD

(75) Inventor: Kissei Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 20 days.

(21) Appl. No.: 11/144,317

(22) Filed: Jun. 3, 2005

(65) Prior Publication Data

US 2005/0270700 A1 Dec. 8, 2005

Related U.S. Application Data

(60) Provisional application No. 60/647,732, filed on Jan. 27, 2005.

(30) Foreign Application Priority Data

Jun. 3, 2004 (JP) ............................. 2004-165744

(51) Int. Cl.
- *G11B 15/04* (2006.01)
- *G11B 15/18* (2006.01)
- *G11B 21/02* (2006.01)

(52) U.S. Cl. .......................................... 360/60; 360/75
(58) Field of Classification Search ...................... None
See application file for complete search history.

(56) References Cited

U.S. PATENT DOCUMENTS 5,227,929 A * 7/1993 Comerford .................. 360/75
5,333,138 A * 7/1994 Richards et al. ............... 360/75
5,521,772 A * 5/1996 Lee et al. ...................... 360/75
6,046,877 A * 4/2000 Kelsic .......................... 360/75
6,178,058 B1 * 1/2001 Pan et al. ...................... 360/60
6,429,990 B2 * 8/2002 Serrano et al. ............... 360/60
6,510,014 B2 * 1/2003 Kikuta et al. ................. 360/60
2004/0125490 A1 * 7/2004 Fujiki et al. .................. 360/75
2004/0252397 A1 12/2004 Hodge et al.
2005/0264914 A1 * 12/2005 Kusumoto .................... 360/75

FOREIGN PATENT DOCUMENTS

| JP | 10-11881 | 1/1998 |
|---|---|---|
| JP | 3441668 | 6/2003 |

* cited by examiner

*Primary Examiner*—K. Wong
(74) *Attorney, Agent, or Firm*—Wolf, Greenfield & Sacks, P.C.

(57) ABSTRACT

A portable apparatus for reproducing audio data includes a recording medium on which the audio data is recorded, a reading head for reading the audio data from the recording medium, an acceleration sensor for detecting acceleration, a buffer memory from which the audio data is read after the audio data is once stored therein; and a processor for executing control of retracting the head from the recording medium in a case where a predetermined value of acceleration is detected by the acceleration sensor when the audio data is temporarily stored into the buffer memory from the recording medium.

3 Claims, 6 Drawing Sheets

STATIONARY STATE

IDEAL

PORTABLE APPARATUS HAVING HEAD RETRACTING FUNCTION AND HEAD RETRACTING METHOD

CROSS REFERENCE TO RELATED APPLICATIONS

This application claims priority under 35 USC §119(e) to U.S. Provisional Application Ser. No. 60/647,732, filed Jan. 27, 2005, which in turn claims priority to Japanese Patent Application No. 2004-165744, filed in the Japanese Patent Office on Jun. 3, 2004, the entire content of which is hereby incorporated by reference.

BACKGROUND OF THE INVENTION

1. Field of the Invention

The present invention relates to a portable apparatus having a head retracting function for detecting a drop of an apparatus to retract a head, and a head retracting method.

2. Description of Related Art

Recently, a hard disk drive (HDD) has progressed to have a large capacity and a small size, and accordingly various electronic apparatus have adopted HDDs.

In particular, the HDD are widely adopted by AV apparatus such as a video camera, a video recorder, audio recorder/player and the like by making use of the feature of having a large capacity. Moreover, owing to the progress of the miniaturization thereof, the HDD is also used for portable AV apparatus.

Now, the HDD is configured to make the magnetic head thereof float at the time of reproducing or recording data from or to the hard disk thereof by rotating the hard disk to roll in the air between the magnetic head and the hard disk. Consequently, when the power supply thereof is abruptly interrupted to stop the rotation of the hard disk, the air is not rolled in between the magnetic head and the hard disk. Then, the magnetic head is contacted with the hard disk to cause disadvantages such as injuring the recording surface thereof to break recorded data and damaging the head.

To avoid such disadvantages, many HDDs are severally equipped with an auto-retraction function for retracting the magnetic head thereof to a position where the magnetic head is not opposed to the hard disk thereof when the power supply thereof is interrupted.

Moreover, in the case where the magnetic head located at a position opposed to the hard disk collides with the hard disk owing to an impact, for example, at the time of a drop of the apparatus, there are the cases where the recording surface of the magnetic disk is significantly injured, recorded data is broken, or the magnetic head is damaged. In particular, in the case where a HDD is built in a portable apparatus, the danger of a drop is large.

Accordingly, some portable electronic apparatus and the like severally plan to protect the HDD thereof from the impact by being provided with, e.g. a mechanical damper, and are adapted to perceive a drop for turning off the operating power supply thereof to be supplied to the HDD, and thereby to retract the magnetic head thereof to a position where the magnetic head is not opposed to the hard disk thereof by means of the auto-retraction function thereof for avoiding a break of the HDD by a drop impact which only the mechanical damper cannot deal with.

In this case, as a method for perceiving the drop, there has been proposed a method for detecting the drop by obtaining the magnitude of a synthesized acceleration vector obtained by detecting acceleration at least in three directions located not on the same plane (or each direction of an X-axis, a Y-axis and a Z-axis, all perpendicular to one another) to synthesize the detected acceleration, and by detecting the magnitude of the synthesized acceleration vector to be stabilized at a value near in the neighborhood of 0 G for a predetermined time to perceive the drop. For example, the method is also disclosed in the below Patent Document 1.

According to the method, a free drop of the HDD from an upper position by 25 cm which is regarded as a limit of the height from which the HDD can drop without being broken is supposed, and the portable electronic apparatus is judged to be dropping when the time during which the magnitude of the synthesized acceleration vector is stable near to 0 G is equal to or longer than a predetermined time (e.g. 100 ms). Then, the magnetic head is retracted to a position where the magnetic head is not opposed to the hard disk.

[Patent Document 1] Japanese Patent Publication No. 3441668

However, the following problem remains in the method described above.

In the case where a vector sum of each direction of the X-axis, the Y-axis and the Z-axis is calculated to be detected near to "0 G" and the value of the vector sum has continued for a predetermined period, a drop is judged, as described above. However, the detection is an accurate judgment only under an ideal condition. The ideal condition means a state in which an acceleration sensor (G sensor) for detecting each piece of acceleration of the X-axis, the Y-axis and the Z-axis is located at the center of gravity of the apparatus and the apparatus is dropping without rotating. The situation is described with reference to FIGS. 5 and 6.

FIG. 5 shows an example of the outputs of a G sensor, i.e. the respective sensor outputs of the X-axis, the Y-axis and the Z-axis, and a vector sum in the sate in which the apparatus is stationary. In the stationary state, each sensor output of each axis indicated by a broken line takes a constant value. In this example, the sensor outputs of the X-axis and the Y-axis is near to 0 G, and the sensor output of the Z-axis is near to 1 G. Incidentally, each value of the sensor outputs of each axis in the stationary state depends on the posture of the apparatus at that time.

Then, the vector sum of the X-axis, the Y-axis and the Z-axis is 1 G as shown by a solid line.

Incidentally, a detection time t1 is set to, e.g. about 100 ms. If the vector sum is near to 0 G continuously during the detection time t1, the state is judged to be a drop in a period t2, and a head retracting operation is performed in a period t3. In the case of FIG. 5, the vector sum is stable at 1 G, and consequently the state is not judged as a drop.

FIG. 6 shows a variation of a vector sum in the case where the apparatus dropped in the ideal state described above.

As shown in the drawing, the value of the vector sum begins to lower immediately after the beginning of a drop, and takes a value of almost 0 G during the drop. In this case, because the vector sum is near to 0 G continuously during the period t1, the state is judged as a drop during the period t2, and the head retracting operation is performed during the period t3.

However, in a nonideal state, the state is not always as the one shown in FIG. 6. That is, the nonideal state is a case where the G sensor is not located at the center of gravity of the apparatus, or a case where a rotation operation accompanies the operation of dropping at the time of the drop.

FIG. 7 shows a vector sum at the time of a rotating drop. Also at the time of the rotating drop, the value of the vector sum is stabilized to a certain value. But the value at the stable state is not always near to 0 G. The case where the vector sum takes the value shown in FIG. 7 is only an example of the values depending on the rotation state and the location position of the G sensor. In the case where the value of the stable state becomes distant from 0 G (becomes near to 1 G), the state is not detected as a drop.

In particular, lest the drop should not be easily judged to perform the retraction operation unnecessarily frequently, a dead zone, which is shown by alternate long and short dash lines, is provided near to 1 G to regard the values in the dead zone as 1 G. When a vector sum at the time of a drop is stabled within the range of the dead zone, no drop judgments are performed in spite of dropping. That is, no retraction operations can be performed.

FIG. 8 shows a case where a vector sum is stabilized near to 1 G at the time of a rotating drop. There is the case where the vector sum stays near to 1 G like that by the variation of each sensor output of the X-axis, Y-axis and the Z-axis as shown by broken lines at the time of the rotating drop. In this case, such a state is not judged to be a drop, and head retraction is not performed. Consequently, there is the possibility that the HDD is broken by a drop impact.

In consideration of HDD player/recorder as a portable apparatus, the miniaturization of the apparatus is important. Owing to the restriction of the mounting of the internal constitution for the miniaturization, there are many cases where a G sensor cannot be disposed at the position of the center of gravity of the apparatus. Moreover, in case of considering the status of use as a portable apparatus, it is expected that rotating drops occur frequently.

That is, there is a problem in which the prior art method of judging a drop by a vector sum being near to 0 G for a predetermined time cannot sometimes suitably judge a drop and is particularly not suitable for portable apparatus.

On the other hand, it is also considerable to provide rotation detecting sensor separately for detecting a rotating drop, but mounting the rotation detecting sensor causes the difficulty of miniaturization, an increase in cost, and the like, and it is especially disadvantageous to portable small-sized apparatus.

SUMMARY OF THE INVENTION

Accordingly, the present invention aims to retract a head surely while executing the output from a buffer memory when an apparatus drops.

A portable apparatus of the present invention aims to judge a drop by means of a G sensor at the time of the buffering of data to a buffer memory, and to retract a head surely in the case of judging the drop.

A portable apparatus of the present invention aims to judge a drop accurately even if a G sensor is not located at a position of the center of gravity and a rotation accompanies a drop, and to make it possible to retract a head surely.

A portable apparatus of the present invention includes a recording medium on which audio data is recorded, a reading head for reading the audio data from the recording medium, an acceleration sensor for detecting acceleration, a buffer memory from which the audio data is read after the audio data is once stored therein, and a processor for executing control of retracting the head from the recording medium in a case where a predetermined value of acceleration is detected by the acceleration sensor when the audio data is temporarily stored into the buffer memory from the recording medium.

Moreover, a portable apparatus of the present invention includes, a recording medium on which audio data is recorded, a reading head for reading the audio data from the recording medium, an acceleration sensor for detecting acceleration in three axis directions, a buffer memory from which the audio data is read after the audio data is once stored therein, and a processor for calculating a synthesized value of acceleration vectors from acceleration in each direction of the three axis directions, the acceleration detected by the acceleration sensor, to retract the head from the recording medium in a case where the processor judges a drop on the basis of values indicating variations of the acceleration in each direction of the three axis directions and a value indicating a variation of the synthesized value during a predetermined period when the audio data is temporarily stored into the buffer memory from the recording medium.

A head retracting method of the present invention detects acceleration with an acceleration sensor, and judges a drop on the basis of the detected acceleration to retract a head surely.

The head retracting method of the present invention includes an acceleration detecting step of detecting acceleration with an acceleration sensor when audio data is temporarily stored in a buffer memory from a recording medium, a judging step of judging whether the acceleration detected by the acceleration sensor has a predetermined value or not; and a retracting step of retracting the head from the recording medium when the acceleration is judged to have the predetermined value.

Moreover, a head retracting method includes a synthesized value calculating step of calculating a synthesized value of acceleration vectors from acceleration in each direction of three axes, the acceleration detected by an acceleration sensor, a variation ascertaining step for ascertaining a value indicating a variation of the acceleration in each direction of the three axes and a value indicating a variation of the synthesized value during a predetermined period when audio data is temporarily stored in a buffer memory from a recording medium, a drop judging step of judging a drop on the basis of the variation of the acceleration in each direction and the variation of the synthesized value; and a head retracting step of retracting a head from the recording medium in case of judging the drop.

As described above, in the case where sensor means is not located at the center of gravity of an apparatus, a vector sum (vector synthesized value) is not always in the neighborhood of 0 G at the time of a rotating drop. But the sensor output of each of the X-axis, the Y-axis and the Z-axis varies in a part of or all of them. Accordingly, by monitoring respective sensor outputs (acceleration), drop detection at the time of a rotating drop or the like can be performed.

According to the present invention, the head retraction at the time of a drop can be surely executed, and then the present invention is suitably applied to the break prevention of a HDD and to the protection of recorded data. Moreover, since the data buffered by the buffer memory at the time of head retraction can be read and output processing can be carried out, it becomes possible to secure the continuity of the output of data also at the time of head retraction. Furthermore, according to the present invention, it is judged whether a drop occurs or not by monitoring the variation situations of both of a vector synthesized value and the acceleration in each direction of the X-axis, the Y-axis and the Z-axis. When the vector synthesized value becomes near to 0 G, a drop state may be judged. Moreover, even when the vector synthesized value is not stabilized near to 0 G at the time of a nonideal drop, since a part of or all of the acceleration in each direction of the X-axis, the Y-axis and the Z-axis varies, it is possible to judge a drop unless a condition of being in a state in which all of the acceleration in each direction of the X-axis, the Y-axis and the Z-axis does not vary.

That is, there can be obtained an effect that a drop judgment can be accurately performed including a nonideal state such as the case where sensor means is not located at a position of the center of gravity, or the time of a rotating drop, by judging a drop by monitoring the variation situation of both of a vector synthesized value and the acceleration in each direction of the X-axis, the Y-axis and the Z-axis.

Then, in case of adopting such a drop judgment for a portable apparatus, the head retraction at the time of a drop can be executed surely, and the adoption is suitable for the breakage prevention of a HDD, and the protection of recorded data.

Moreover, the present invention is especially suitable for small portable apparatus. That is, since a drop detection can be surely performed including a rotating drop, the protection function in the portable apparatus having frequent chances of rotating drops can be accurately activated. For example, the protection function of a HDD can be heightened in a portable hard disk apparatus.

Furthermore, since sensor means is not necessarily located at a position of the center of gravity, the freedom of a mounting arrangement design is widened, and the present invention is especially advantageous to a design aiming at miniaturization. Moreover, the fact that a rotation sensor dedicated for the detection of a rotating drop is not necessary is also advantageous to miniaturization or the reduction of costs.

Further features of the invention, and the advantages offered thereby, are explained in detail hereinafter, in reference to specific embodiments of the invention illustrated in the accompanying drawings.

DESCRIPTION OF THE PREFERRED EMBODIMENTS

In the following, as an embodiment of the present invention, a portable hard disk apparatus is described. The portable hard disk apparatus is especially supposed to be a portable audio-visual (AV) recorder having a HDD built-in capable of recording/reproducing a video signal an audio signal to a HDD.

Figure 1:
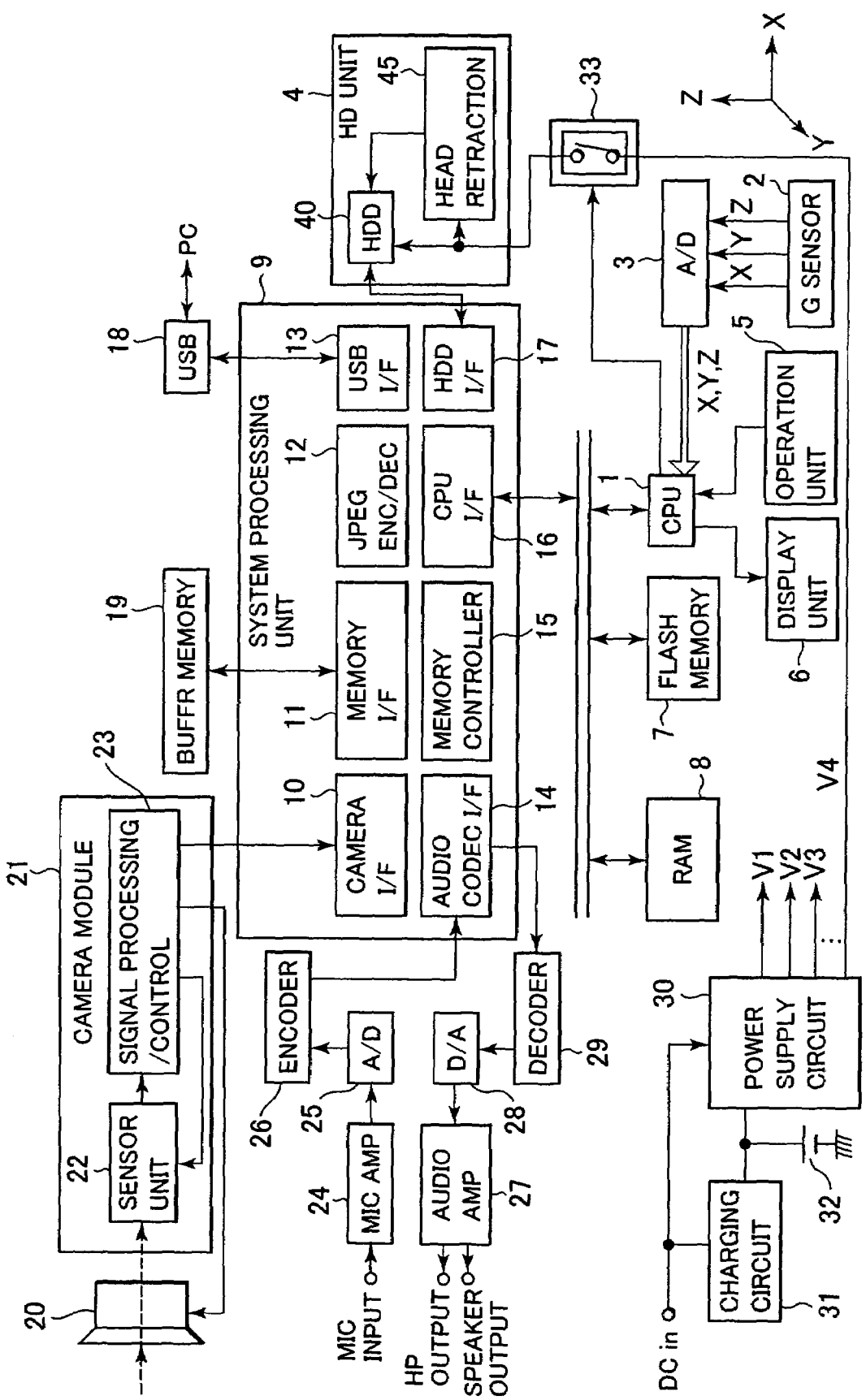
FIG. 1 is a block diagram of a HDD recording and reproducing apparatus of an embodiment of the present invention.

FIG. 1 is a block diagram of an AV recorder having an HDD built-in of an embodiment, and particularly exemplifies an apparatus to be used as a video camera having an HDD built-in by a user.

The AV recorder having an HDD built-in is provided with a lens system 20 and a camera module 21 as a section for imaging a subject.

The light from the subject enters a sensor unit 22 of the camera module 21 through the lens system 20. The sensor unit 22 includes a solid-state image sensing device unit composed of a lot of pixels as a CCD sensor array or a CMOS sensor array, a vertical scanning circuit and a horizontal scanning circuit, both for driving the solid-state image sensing device unit, a reading amplifier, an AGC circuit, an A/D converter and the like. Then, the solid-state image sensing device unit performs the photoelectric conversion of the incident light from the subject through the lens system 20, and outputs the converted signal as the signal of each pixel. Pixel signals output from each pixel are vertically and horizontally transferred to be an imaging image signal stream constituting an image of a frame.

The imaging image signal read out of the sensor unit 22 is processed by a signal processing/control unit 23. The signal processing/control unit 23 executes the cramp processing, the defect correcting processing, the white balance processing, the Y/C processing and the like of the imaging image signal, and further performs the encoding of the signal to the video data having a predetermined video format to output the encoded signal to a system processing unit 9. The predetermined video format indicates, for example, the RGB format, the YUV format (Y: luminance signal, U: B-Y color difference signal, V: R-Y color difference signal), the NTSC format or the like.

Moreover, the signal processing/control unit 23 also performs the processing of focus control, zoom control and exposure adjustment in the lens system 20, and control signal generation (a vertical synchronizing signal, a horizontal synchronizing and the like) to the sensor unit 22.

Moreover, the an AV recorder having the HDD built-in is provided with a microphone amplifier 24, an A/D converter 25, an encoder 26, an audio amplifier 27, a D/A converter 28 and a decoder 29 for audio input and output.

A voice signal from a connected microphone (or from a microphone built-in the AV recorder having the HDD built-in) is input into the microphone amplifier 24. The microphone input voice signal having a predetermined gain given by the microphone amplifier 24 is converted to digital audio data by the A/D converter 25, and is encoded into a predetermined signal format by the encoder 26. Then, the encoded data is supplied to the system processing part 9.

Moreover, from the system processing unit 9, the audio data to be reproduced and output is supplied to the decoder 29. The decoder 29 performs the decoding processing of the supplied audio data, and supplies the decoded data to the D/A converter 28 as, for example, linear PCM data. Then, the decoded data is converted to an analog voice signal by the D/A converter 28, and receives equalizing and amplification processing by the audio amplifier 27. The processed voice signal is output as a headphone output voice or a speaker output voice.

For example, the system processing unit 9 formed of one LSI performs the processing of recording on a HDD 40, which will be described later, the video data supplied from the camera module 21 and the audio data supplied from the encoder 26, and the processing of outputting the audio data/video data read from the HDD 40.

A camera interface 10 in the system processing unit 9 performs the input processing of the video data from the camera module 21.

An audio codec interface 14 performs the input processing of the audio data from the encoder 26, and the output processing of the audio data to the decoder 29.

A memory interface 11 performs reading/writing of the recoding/reproducing data of the HDD 40 from and to a buffer memory 19, respectively, in accordance with the control of a memory controller 15. For example, the video data supplied from the camera module 21 and the audio data supplied from the encoder 26 for being recorded into the HDD 40 are once buffered into the buffer memory 19 by the memory interface 11. Then, necessary processing is performed to the data to be supplied to the side of the HDD 40 as record data.

Moreover, the data read out of the HDD 40 is buffered by the buffer memory 19 while being read out at predetermined timing to receive the output processing thereof.

A JPEG encoder/decoder 12 performs compression encoding of the data recorded on the HDD 40 by the JPEG format. Moreover, the JPEG encoder/decoder 12 decodes the data of the JPEG format read from the HDD 40.

A USB interface 13 performs the interface processing of data communication with an external apparatus such as a personal computer connected through a USB connecting unit 18. It is needless to say that the USP interface 13 also performs the processing of transmitting and outputting the data read from the HDD 40 to the external apparatus through the USB connecting unit 18, and the processing of taking in the data supplied to the USB connecting unit 18 from the external apparatus to record the data on the HDD 40.

A CPU interface 16 performs the interface processing with a CPU 1 which controls the whole of the AV recorder having the HDD built-in. The control signal from the CPU 1 is received by the CPU interface 16, and the operation of each section in the system processing part 9 is controlled. Moreover, necessary information acquired within the system processing unit 9 is supplied to the CPU 1 through the CPU interface 16.

A HDD interface 17 performs the output processing of the record data to the HDD 40, and the input processing of the reproduction data from the HDD 40. Moreover, the HDD interface 17 also performs the data formatting in the case of recording, for example, the blocking of error-correction codes, error correction processing at the time of reproduction, etc.

The AV recorder having the HDD built-in is provided with a hard disk unit (HD unit) 4 therein, and the hard disk drive (HDD) 40 in the HD unit 4 performs the recording/reproducing video data and audio data. The HDD 40 is provided with a hard disk as a magnetic disk, a magnetic head which executes recording and reproducing to and from the hard disk, as will be described later with reference to FIGS. 2A-to 2C.

Moreover, the HD unit 4 is also provided with a head retraction processing unit 45. As the so-called auto-retraction function, the head retraction processing unit 45 executes the processing of retracting the magnetic head in the HDD 40 to a position where the magnetic head is not opposed to the hard disk when the operating power supply is interrupted.

A power supply circuit 30 generates operating power supply voltages V1, V2, . . . necessary for each unit in the AV recorder having the HDD built.

The AV recorder having the HDD built-in uses, for example, a DC voltage from an AC adapter for converting a commercial AC power supply to a DC voltage, or a built-in battery 32 (for example, a secondary battery) as its power supply. The power supply circuit 30 performs the DC/DC conversion of a DC voltage from the AC adapter or the battery 32 to generate the necessary operating power supply voltages V1, V2 . . . .

Moreover, a charging circuit 31 performs the processing of charging the battery 32 by means of the DC voltage from the AC adapter.

Incidentally, the operating power supply voltage V4 from the power supply circuit 30 is especially used as the operating power supply voltage of the HDD 4 in this example, and the operating power supply voltage V4 is supplied to the HD unit 4 through a HDD power supply switch 33. By the on/off control of the HDD power supply switch 33 with the CPU 1, the turning on/off of the operating power supply to the HD unit 4 is performed.

The CPU 1 controls the whole apparatus according to an operation of a user using an operation unit 5 or an operation program. Moreover, the CPU 1 makes a display unit 6 execute a display operation necessary for user interface.

A flash memory 7 stores constants, coefficients and the like necessary for the storage and the control processing of the operation program of the CPU 1.

A RAM 8 is used as a work area of the CPU 1, or is used for the storage of the information necessary on a process of operation.

A G sensor 2 is mounted on the AV recorder having the HDD built-in. The G sensor 2 is configured to detect the acceleration in each of the X-axis, the Y-axis and the Z-axis being each 3-dimensional axis perpendicular to one another as shown in the drawing. An X value, a Y value and a Z value as each piece of acceleration in the X-axis, the Y-axis and the Z-axis are severally converted to be digital data by an A/D converter 3 to be supplied to the CPU 1.

Figure 2A:
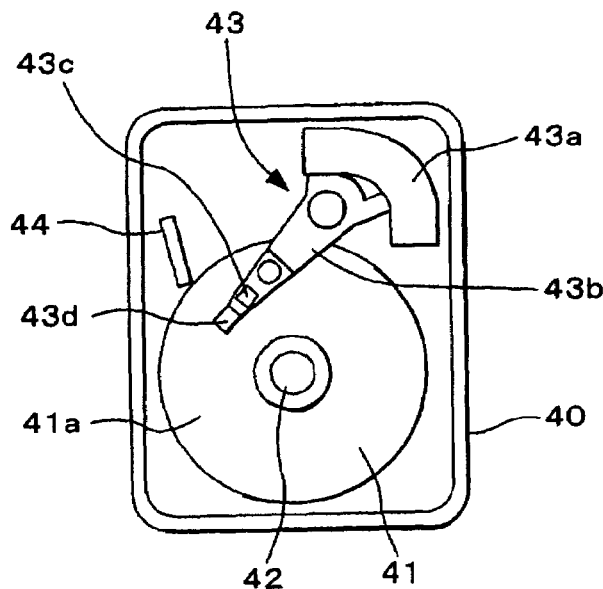
FIGS. 2A to 2C are explanatory diagrams of a hard disk drive of the embodiment.
Figure 2B:
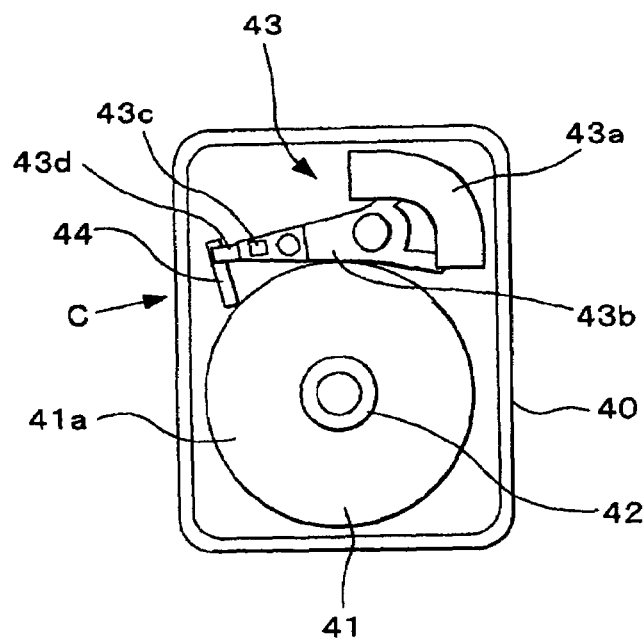
Figure 2C:
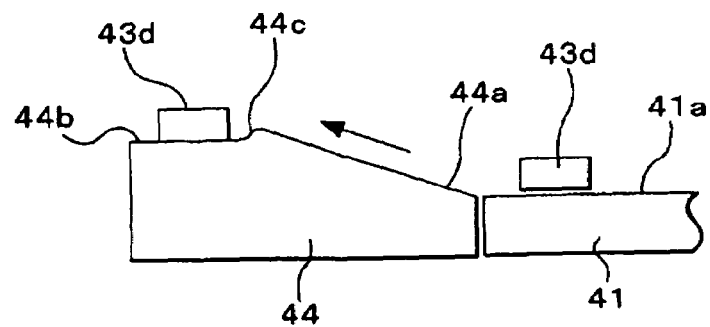

The configuration of the HDD 40 is shown in FIG. 2A to 2C.

As shown in FIGS. 2A and 2B, the HDD 40 is equipped with a magnetic disk 41 as a recording medium, and the magnetic disk 41 is rotated by a spindle motor 42. Moreover, the HDD 40 is equipped with a linear motor type drive unit 43a, an arm 43b rotated by the drive unit 43a, a magnetic head 43c supported by a not shown gimbals mechanism at a position near to the tip of the arm 43b, and a load plate 43d projecting from the tip portion of arm 43b as a rotating type actuator 43.

Moreover, a ramp 44 is provided so that the ramp 44 may be located on the movement locus of the magnetic head 43c at a position adjacent to the magnetic disk 41. As shown in FIG. 2C, the ramp 44 is shaped to be a pedestal, and includes an inclined portion 44a inclining so as to lower to the side of the magnetic disk 41 on the top surface, and a rest portion 44b continuing to the opposite side of the inclined portion 44a to the magnetic disk 41. The height of the end of the inclined portion 44a on the side of the magnetic disk 41 is almost the same as the height of a recording surface 41a of the magnetic disk 41, or is slightly lower than the height of the recording surface 41a. The rest portion 44b is in parallel with the recording surface 41a of the magnetic disk 41 except the end 44c on the side of the inclined portion 44a, and the rest portion 44b is located at a position higher than that of the recording surface 41a. Moreover, the rest portion 44b is located at a position a little lower than that of the end of the inclined portion 44a on the opposite side of the end on the side of the magnetic disk 41. Then, the end 44c of the rest portion 44b on the side of the inclined portion 44a continues to the inclined portion 44a in the state of being curved in the shape of a gently sloping concave.

The writing and the reading of a signal to and from the magnetic disk 41 in the HDD 40 is performed while rotating the arm 43b by the drive unit 43a so that the magnetic head 43c may slightly float above the recording surface 41a of the magnetic disk 41 which is being rotated by the spindle motor 42 (see FIG. 2A). Then, when no writing and no reading of any signals are performed to the magnetic disk 41, the load plate 43d at the tip portion of the arm 43b is in the state of being placed on the rest portion 44b of the ramp 44 (see FIGS. 2B and 2C).

Although the details will be described later, the CPU 1 performs drop detecting processing on the basis of the acceleration of the thee axes detected by the G sensor 2. When the drop state of the AV recorder having the HDD built-in is detected, the CPU 1 turns off the HDD power supply switch 33. Then, the operating power supply voltage to the HDD 40 is interrupted, and accordingly the head retraction processing unit 45 executes head retraction processing as an auto-retraction function. The retraction in that case is to make the arm 43b be put in the state shown in FIG. 2B. That is, when a drop is detected during an operation (in the state of FIG. 2A), the drive unit 43a is controlled by the head retraction processing unit 45 to rotate the arm 43b to the position shown in FIG. 2B promptly. Then, the load plate 43d at the tip of the arm 43b slides up on the inclined portion 44a of the ramp 44, and becomes the state of being placed on the rest portion 44b across the uppermost part of the inclined portion 44a. Because the rest portion 44b is located on the outside of the magnetic disk 41 and is at the position sufficiently higher than the recording surface 41a of the magnetic disk 41, the magnetic head 43c does not collide with the recording surface 41a of the magnetic disk 41 even if the arm 43b may be bent by a strong impact. Moreover, because the drive unit 43a is the one of a linear motor type, by locking the arm 43b electromagnetically at the position shown in FIG. 2B by means of large electric power at the time of the retraction, the arm 43b will not ride across the backmost part of the inclined portion 44a to return to the side of the magnetic disk 41 even if there is a strong impact.

Incidentally, when the HDD 40 is operated again, by rotating the arm 43b, the load plate 43d slides up on the bent portion 44c of the rest portion 44b, and further passes through the inclined portion 44a to move toward the direction of the magnetic disk 41.

Incidentally, it is not only at the time of detecting a drop that the head retraction is performed in such a way, but also the load plate 43d is retracted in the state of FIG. 2B at the time when no recording or reproducing access is performed in the HDD 40. For example, in a period when no access to the HDD 40 is performed, the CPU 1 turns off the HDD power supply switch 33. Then, head retraction is performed in the HDD 40, and consequently the collision of the magnetic head 43c with the magnetic disk 41 owing to an impact or the like applied at a no action time can be avoided and an electric power saving effect is also acquired. Furthermore, thereby it also becomes unnecessary to perform drop detection, which will be described later, at the no action time of the HDD 40, and the processing load of the CPU 1 also decreases. And the situation also leads to the electric power saving effect. Since it is important to reduce power consumption in a portable type apparatus especially, it is effective to turn off the HDD power supply switch 33 at the no action time.

Now, various kinds of examples of the retraction operation of the magnetic head 43c itself can be considered besides the above described one. For example, various means such as enforcing the position of the arm 43b electromagnetically so that, with the position of the arm 43b under operation being fixed, the arm 43b may be made not to move toward the magnetic disk 41 nearer than the fixed position, or that the arm 43b may be pulled away from the magnetic disk 41 slightly can be considered.

Alternatively, it is also considerable to locate contact preventing means between the magnetic head 43c and the magnetic disk 41. For example, it is possible to adopt a mechanism in which an engaging portion is formed on the magnetic head 43c or on the arm 43b supporting the magnetic head 43c and a portion to be engaged as the contact preventing means protrudes so that the portion to be engaged and the engaging portion may be engaged with each other at the time of the detection of a drop to avoid the contact of the magnetic head and the magnetic disk.

For example, an operation of judging a drop state of the apparatus of the AV recorder having the HDD built-in having the configuration described above is described.

Figure 3:
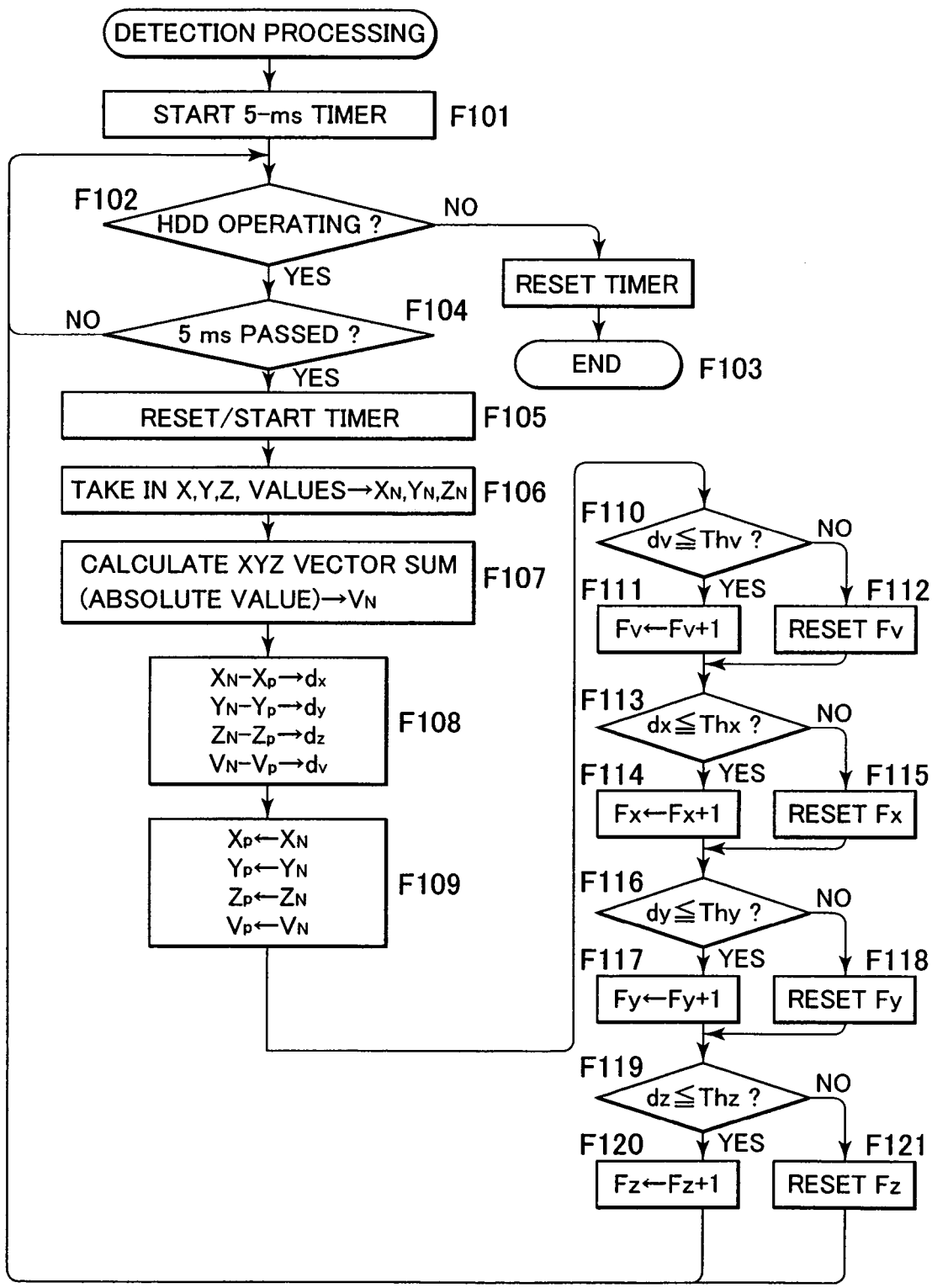
FIG. 3 is a flowchart of the detection processing of an sensor output of the embodiment.
Figure 4:
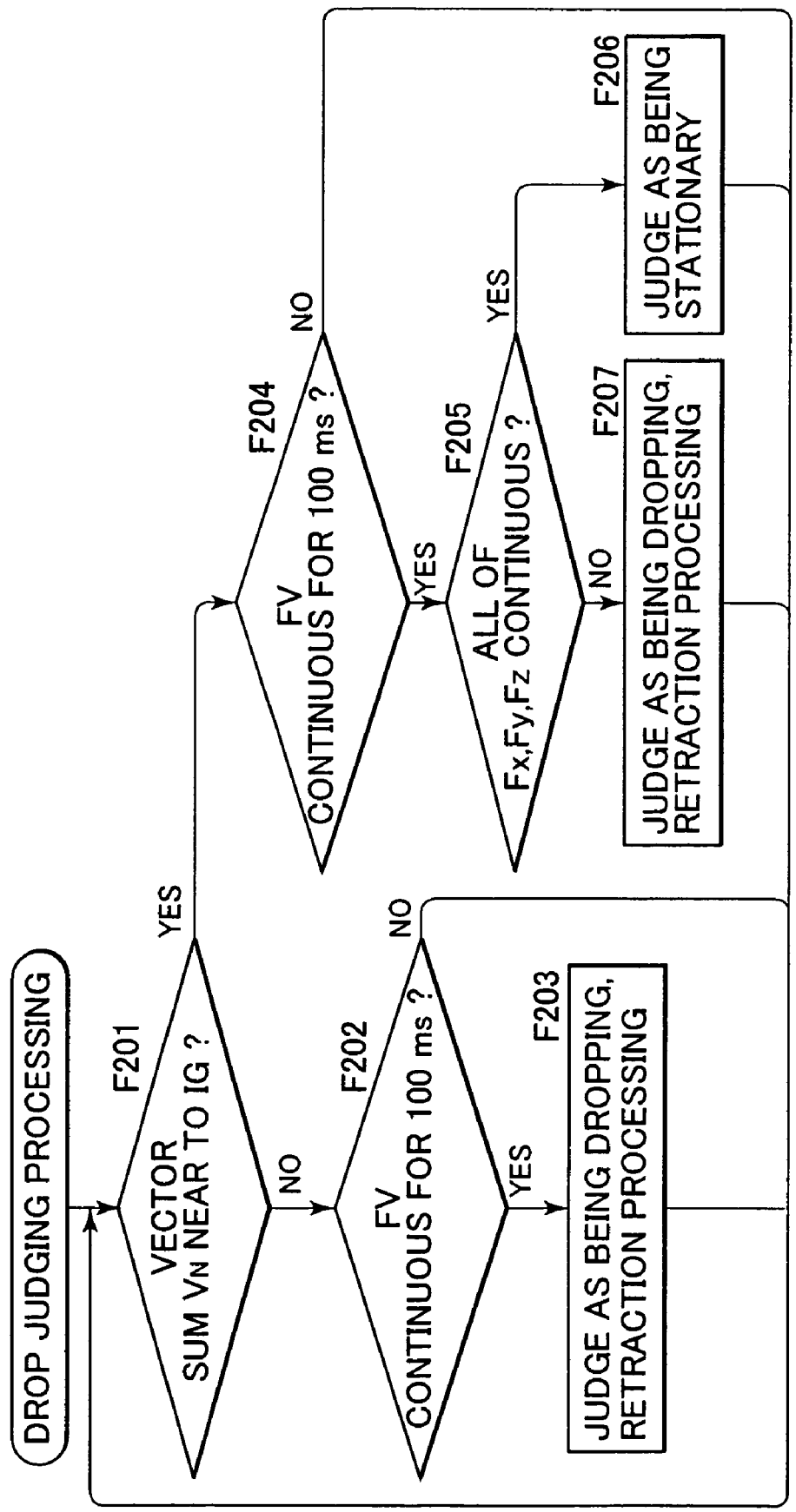
FIG. 4 is a flowchart of the drop judging processing of the embodiment.

The CPU 1 performs detection processing of FIG. 3 and drop judging processing of FIG. 4 as the processing for detecting a drop state.

FIG. 4 shows the processing by which the CPU 1 takes in the detection values of the G sensor 2, i.e., an X value, a Y value and a Z value. The CPU 1 is supposed to perform the sampling of the sensor output values, for example, every 5 ms.

When recording and reproducing access is started in the HDD 40, the CPU 1 starts the processing of FIG. 3. A 5-ms timer is first started at Step F101. However, when it is judged that the HDD 40 is not in operation at Step F102, the processing proceeds to Step F103. Then, the timer is reset, and the processing is terminated. The expression such that the HDD 40 is not in operation here indicates a state in which no recording and reproducing access is performed, and includes the case where the HDD power supply switch 33 is turned off, or the case where the magnetic head 43c is in the state of FIG. 2B though the power supply is not turned off. The reason is that, as described above, at the time of the retraction state of FIG. 2B, the head retracting operation by drop detection becomes unnecessary.

During an operation period of the HDD 40, the CPU 1 monitors the elapse of 5 ms by means of the 5-ms timer at Step F104. Then, at the time point when 5 ms has passed, the progressing proceeds to Step F105. Then, the CPU 1 resets the 5-ms timer and starts counting again. At step F106, the CPU 1 takes in an X value, a Y value and a Z value from the G sensor 2 and the A/D converter 3.

Here, the taken X value at this time is held as a register XN. Similarly, the Y value and the Z value are held as registers YN and ZN.

Successively, at step F107, a vector sum as an absolute value is calculated. That is, the X value, the Y value and the Z value taken as the registers XN, YN, and ZN, respectively, are added to one another to be the vector sum VN.

At step F108, the CPU 1 calculates the respective differences of the X value, the Y value and the Z value which have been sampled at the last time and the X value, the Y value and the Z value which are sampled at this time, and the difference of vector sum at the last time and the vector sum at this time.

The X value, the Y value, the Z value and the vector sum at the last time are held as the registers XP, YP, ZP and VP (by the processing at Step F109). Therefore, the differences of the X, the Y and the Z values, and the difference of the vector sums are calculated as follows:

the difference of the X value dx=XN−XP the difference of the Y value dy=YN−YP the difference of the Z value dz=ZN−ZP the difference of the vector sum dv=VN−VP.

Incidentally, at Step F109, for using the X value, the Y value, the Z value and the vector sum at this time, which have been held in the registers XN, YN, ZN, and VN, respectively, as the values at the last time in the next processing after 5 ms, the X value, the Y value, the Z value and the vector sum at this time are held in the resisters XP, YP, ZP, and VP, respectively.

When each of the differences dx, dy, dz and dv is obtained, the existence of a change in each difference is examined.

First, at Step F110, the difference dv of the vector sum is compared with a threshold value Thv. The threshold value Thv is the maximum value of the difference dv of the vector sums at the preceding time and at this time within a range in which it is possible to regard that no changes have occurred between the vector sums at the preceding time and at this time. Therefore, in case of dv≦Thv, it is judged that no changes of the vector sum have occurred, and a variable FV prepared for the vector sum is incremented in that case at Step F111.

On the other hand, in case of dv>Thv, it is judged that some changes have occurred in the vector sum, and the variable FV is reset in that case at Step F112.

Similar processing is also performed to each of the differences dx, dy, and dz.

That is, at Step F113, the difference dx of the X value is compared with the threshold value THx for the judgment of the existence of a change. In case of dx≦Thx, it is regarded that no changes have occurred in the X value, and the variable Fx prepared for the X value is incremented at Step F114. In case of dx>Thx, it is regarded that a change has occurred in the X value, and the variable Fx is reset at Step F115.

Moreover, at Step F116, the difference dy of the Y value is compared with the threshold value THy for the judgment of the existence of a change. In case of dy≦Thy, it is regarded that no changes have occurred in the Y value, and the variable Fy prepared for the Y value is incremented at Step F117. In case of dy>Thy, it is regarded that a change has occurred in the Y value, and the variable Fy is reset at Step F118.

Moreover, at Step F119, the difference dz of the Z value is compared with the threshold value THz for the judgment of the existence of a change. In case of dz≦Thz, it is regarded that no changes have occurred in the Z value, and the variable Fz prepared for the Z value is incremented at Step F120. In case of dz>Thz, it is regarded that a change has occurred in the Z value, and the variable Fz is reset at Step F121.

The processing returns to Step F102 after the above processing. Then, when it is judged that 5 ms have passed at Step F104, similar processing is performed after Step F105.

By performing the processing of FIG. 3, in the case where each of the X value, the Y value, the Z value and the vector sum does not have any change to be stable, the values of the variables Fx, Fy, Fz and FV corresponding to each of the X value, the Y value, the Z value and the vector sum become larger. Since the processing is that at every 5 ms, for example, in the case where the value of the variable Fx is "20", it is shown that the X value is stable during the period of 100 ms.

The CPU 1 continues the processing of FIG. 3 during the operation of the HDD, and performs the drop judging processing of FIG. 4 at the same time.

At Step F201, it is first judged whether the value of the vector sum, i.e., the value held in the register VN, is in the neighborhood of 1 G or not. The neighborhood of 1 G indicates, for example, the values within the dead zone shown in FIG. 7.

Figure 6:
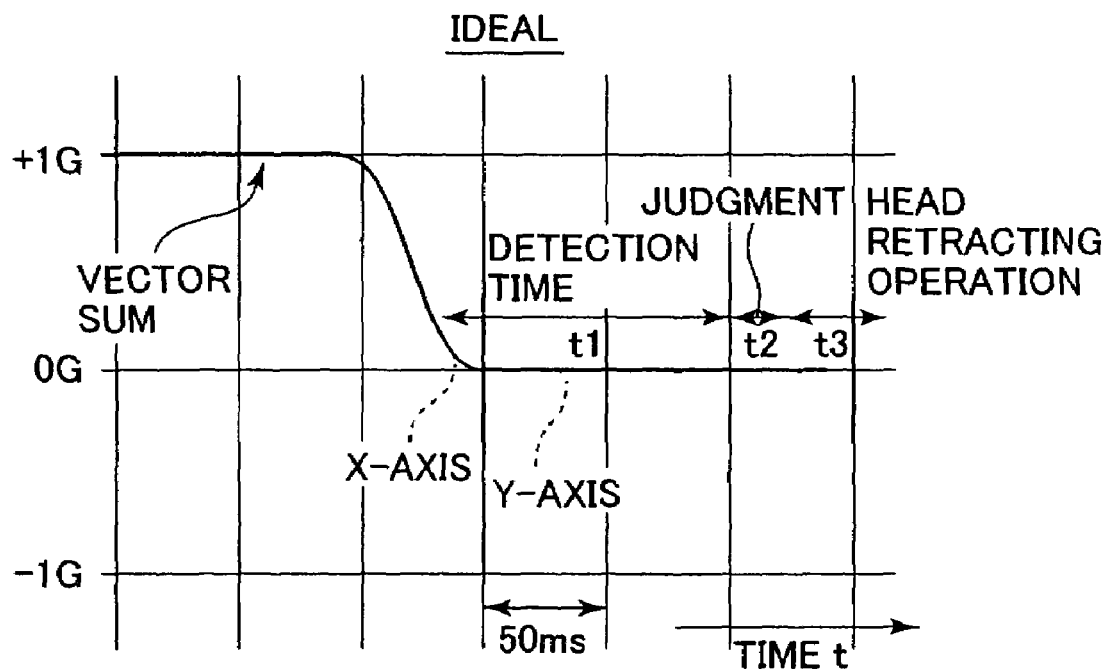
FIG. 6 is an explanatory diagram of a vector sum at the time of a drop in an ideal state.
Figure 7:
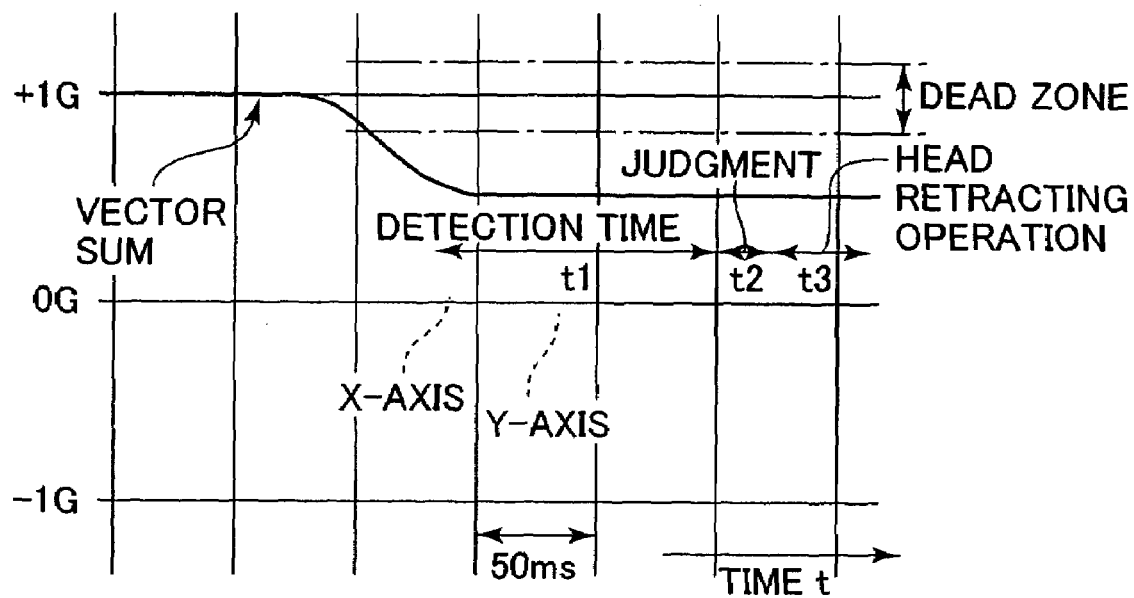
FIG. 7 is an explanatory diagrams showing a vector sum at the time of a rotating drop.

For example, when the AV recorder having the HDD built-in is dropping, as described with reference to FIG. 6 or 7, there is a case where the value of the vector sum is stabilized at a certain value which is not in the neighborhood of 1 G.

Then, when it is judged that the value of the vector sum is not in the neighborhood of 1 G, the processing proceeds to Step F202. At Step F202, the value of the variable FV is ascertained, and it is judged whether the value has been stable during the period for 100 ms or not. That is, it is ascertained whether the value of the variable FV reaches "20" or not.

In the case where the value of the variable FV does not reach "20", there is the possibility of the acceleration variation owing to a drop. But, since it is the case where the detection time t1 in FIGS. 6 and 7 has not passed yet, the processing returns to Step F201.

Figure 5:
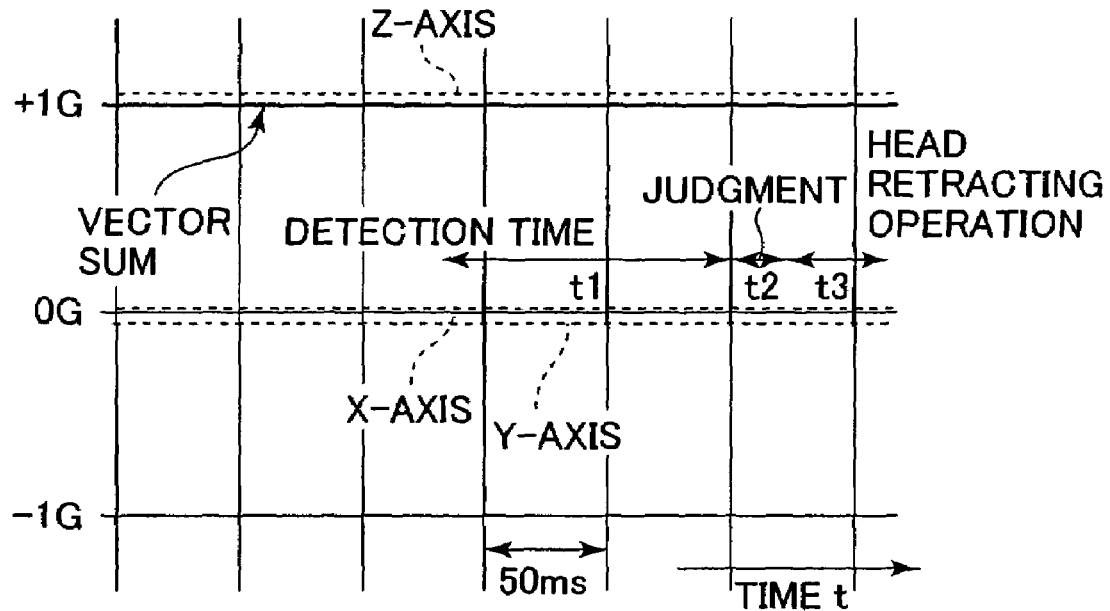
FIG. 5 is an explanatory diagram of sensor outputs and a vector sum at the time of a stationary state.

In the case where the variable FV has reached "20" at Step F202 still in the state where the vector sum is not in the neighborhood of 1 G, it can be judged that during the period of 100 ms the vector sum has been stable not in the neighborhood of 1 G. Since the state can be judged to be the case where the apparatus is dropping in an ideal state as shown in FIG. 5 or the case where the apparatus is rotating while dropping as shown in FIG. 6, the processing proceeds to Step F203, and judges that the apparatus is during a drop. Then, the CPU 1 performs the head retraction processing of the HDD 40. That is, the CPU 1 turns off the HDD power supply switch 33, and executes the head retraction by the auto-retraction function.

In the case where it is judged that the vector sum is in the neighborhood of 1 G at Step F201, the processing proceeds to Step F204. The case where the vector sum is in the neighborhood of 1 G is the case where the apparatus is in a stationary state as shown in FIG. 5, or the case where the vector sum has been stabilized in the neighborhood of 1 G during a rotating drop.

Fist, at Step F204, the value of the variable FV is ascertained, and it is judged whether the value of the vector sum is stable during the period for 100 ms or not. That is, it is ascertained whether the value of the variable FV reaches "20" or not.

Figure 8:
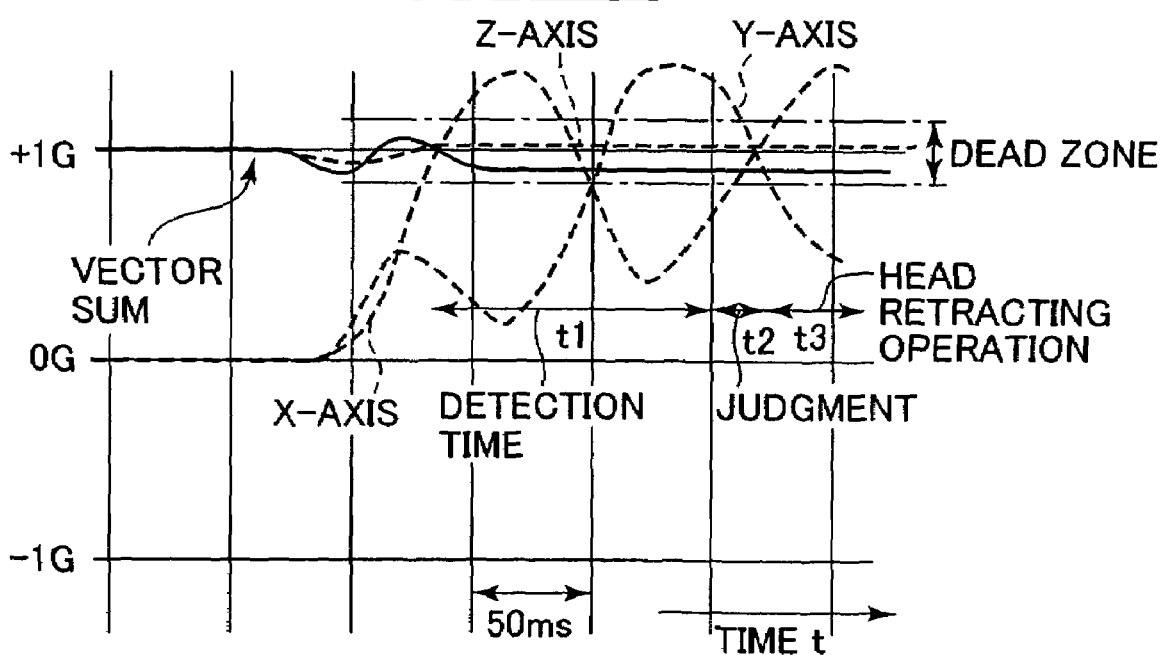
FIG. 8 is an explanatory diagram of a vector sum and sensor outputs at the time of a rotating drop.

In this case, the case where the value of the variable FV does not reach "20" indicates a period in which the vector sum is changing immediately after the occurrence of a drop, or a period in which the apparatus is dropping and the detection time t1 of FIG. 8 has not elapsed yet, though the vector sum is stable. Accordingly, the processing returns to Step F201.

In the case where the value of the variable FV reaches "20" at Step F204, that is, it is judged that the value of the vector sum is stable more than the period for 100 ms, then the CPU 1 ascertains each of the values of the variables Fx, Fy, and Fz at Step F205.

In the case where all the variables Fx, Fy and Fz are stable, namely, all the variables Fx, Fy, and Fz are "20" or more, all of the X value, the Y values and the Z value have not changed during the period for 100 ms or more, and the state can be judged as the stationary state of FIG. 5.

Accordingly, when all the variables Fx, Fy, and Fz are "20" or more, the processing proceeds to Step F206, and the state is judged as the stationary state.

On the other hand, in the case where the apparatus is during a rotating drop, the X value, the Y value and the Z value vary as shown in FIG. 8. Although FIG. 8 is only an example, and the way of the variations changes depending on a rotation posture, a rotation speed, an installation position of the G sensor 2 in the apparatus, and the like, and not all of the X value, the Y value and the Z value are changed, but the apparatus is not in the state where all of the X value, the Y value and the Z value are stable. For example, in the example of FIG. 8, the X value and the Y value are changing continuously. Considering that the vector sum is constant, many cases of the rotating dropping can be considered to be ones where two of the X value, the Y value and Z value or all of the three values are changing.

That is, if a rotation drop has arisen, a part of or all of the variables Fx, Fy and Fz are repeatedly reset in the processing of FIG. 3.

Therefore, if even any one of the variables Fx, Fy and Fz does not reach "20" (namely, the condition in which all of them are stable for a period of 100 ms is not satisfied), it is regarded that an acceleration variation in a certain axis direction has occurred, and the situation may be judges that the apparatus is in a rotating drop. Then, the processing proceeds to Step F207, and the CPU 1 judges that the apparatus is in a drop to perform the head retraction processing of the HDD 40. That is, the CPU 1 turns off the HDD power supply switch 33, and executes the head retraction by the auto-retraction function.

By the execution of the processing of FIG. 4 by the CPU 1, a drop of an apparatus can be correctly detected even if the apparatus drops without rotation or even if the apparatus drops with rotation, and the head retraction can be executed.

That is, in the processing of FIG. 4, in case of a drop which is not accompanied by a rotation, or in the case where a vector sum is stable in the neighborhood of 1 G even if a rotation accompanies the drop, drop judgment can be performed at Steps F201 to F203. Moreover, in the case where the vector sum is stabilized in the neighborhood of 1 G during a rotating drop, drop judgment can be performed at Steps F204 to F207.

Incidentally, the drop judging processing shown in FIG. 4 is an example, and, otherwise, examples of the processing can be considered. For example, the value of the variable FV may be first judged (whether the vector sum is stable for a predetermined time or not). When the vector sum is stable, whether the vector sum is stable at a point near to 1 G or not is judged. When the point is not near to 1 G, the apparatus is judged to be dropping. When the point is near to 1 G, the variables Fx, Fy and Fz is ascertained, and drop/stationary may be judged.

Moreover, that the judging time of the stability of the vector sum at Steps F202 and F204 is set to 100 ms is an example, and a suitable time may be set as the time. It is needless to say that the judgment time of the stability/variation about the X value, the Y value and the Z value in Step F205 may not be 100 ms. Moreover, the time is not necessary to be the same as the stable judgment time of the vector sum at Steps F202 and F204.

As apparent from the above description of the embodiment, by judging whether the apparatus is dropping or not by monitoring the variation situations of both of the acceleration in each direction of the X-axis, the Y-axis and the Z-axis and the vector synthesized value of the pieces of the acceleration, the drop judgment can be performed accurately also including non-ideal states in the case where the G sensor 2 is not located at the position of the center of gravity in the apparatus or at the time of a rotating drop. And by such a drop judgment, the head retraction of the HDD 40 at the time of a drop can be surely executed, and the present invention is suitable for the prevention of breakage of the HDD 40, or the protection of recorded data.

Moreover, the present invention can be said to be especially suitable for a small portable type apparatus. That is, since the drop detection including the detection of a rotating drop can be performed surely, the protection function in the portable type apparatus in which rotating drops frequently occur can be activated correctly, and the protection function of the HDD 40 can be heightened in the portable type AV recorder having the HDD built-in like the present example.

Furthermore, since the G sensor 2 is not necessarily arranged at the position of the center of gravity, the degree of freedom of the design of a mounting arrangement is widened, and the present invention is especially advantageous to a design aiming at miniaturization. Moreover, the nonnecessity of a rotation sensor dedicated for the detection of the rotating drop is advantageous to the miniaturization and the reduction of costs.

Now, as a portable apparatus of the present invention, the present invention is applicable to various apparatus.

For example, a portable AV apparatus may not be only the apparatus including an imaging function as shown in FIG. 1, but also may be an audio player recorder having a HDD built-in. Moreover, the present invention is applicable also as a PDA, a portable personal computer, etc. Furthermore, the present invention can be adopted as not only a portable apparatus but also as a stationary type apparatus. That is, the hard disk apparatus of the preset invention is realizable as all apparatus that contains HDD therein.

Moreover, the hard disk apparatus of the present invention may not be an apparatus equipped with a HDD fixedly, but also may be one installing a removable HDD.

Moreover, a portable apparatus including a head retracting function, and a head retracting method of the present invention can be applied to an apparatus other than a hard disk apparatus. For example, in the apparatus which performs recording and reproducing to a recording medium such as an optical disc and a magneto-optical disc, in the case where a drop impact is imposed at the time of recording by performing laser irradiation from an optical pickup, a tracking blank arises while the laser irradiation has the high laser power for recording, and there is the possibility of destroying the record data of an adjoining track. Accordingly, it is very suitable that the portable apparatus having the head retracting function and the head retracting method of the present invention are adopted to detect a drop accurately for performing a process such as stopping a laser output immediately in that case (or reducing the laser power).

Moreover, there are various apparatus equipped with a magnetic head besides the HDD, such as a recording reproducing apparatus corresponding to a magneto-optical disc such as a mini disc and an MO disk, and the present invention is applicable also to the drop detection for performing the retraction of the magnetic head in such an apparatus, or an operation of other data protection.

Of course, the present invention is suitable for being applied to an apparatus as long as it is one for performing some operations in preparation for a drop impact though the apparatus is not an optical disc apparatus or a magneto-optical disc apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. A portable apparatus for reproducing audio data, comprising:
   a recording medium on which the audio data is recorded;
   a reading head for reading the audio data from said recording medium;
   an acceleration sensor for detecting acceleration in three axis directions; and
   a processor for calculating a synthesized value of acceleration vectors from acceleration in each direction of the three axis directions, the acceleration detected by said acceleration sensor, to retract said head from said recording medium in a case where said processor judges a drop on a basis of values indicating variations of the acceleration in each direction of the three axis directions, and a value indicating a variation of the synthesized value during a predetermined period.

2. The portable apparatus according to claim 1, wherein said processor judges a drop to retract said head from said recording medium when a variation value of the acceleration in any one direction of the three axes is detected during a predetermined period.

3. The portable apparatus according to claim 1, wherein said processor calculates the synthesized value of the acceleration vectors from the acceleration in each direction of the three axes, the acceleration detected by said acceleration sensor, and said processor detects a drop on the basis of one of two conditions occurring, the two conditions including a first condition wherein the synthesized value is not within a predetermined range in a neighborhood of 1 G over a predetermined period, and a second condition wherein the synthesized value is within a predetermined range in the neighborhood of 1 G for a predetermined period and acceleration along the three axes varies for a predetermined period, and thereby said processor retracts said head from said recording medium.

* * * * *